Sept. 10, 1940.    L. ROSENTHAL    2,214,567
SPEED CONTROL MECHANISM
Filed July 13, 1936    2 Sheets-Sheet 1
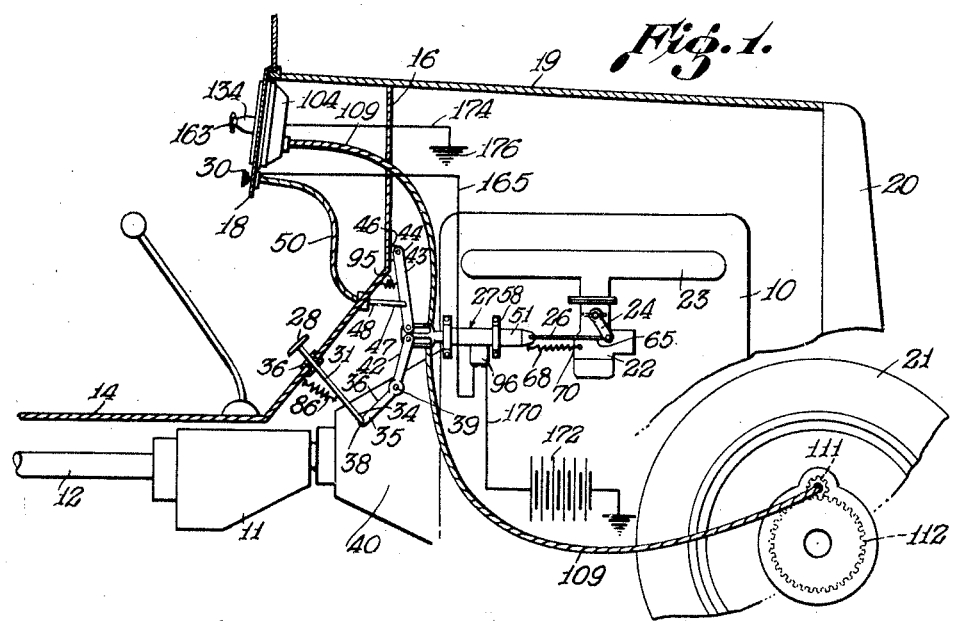
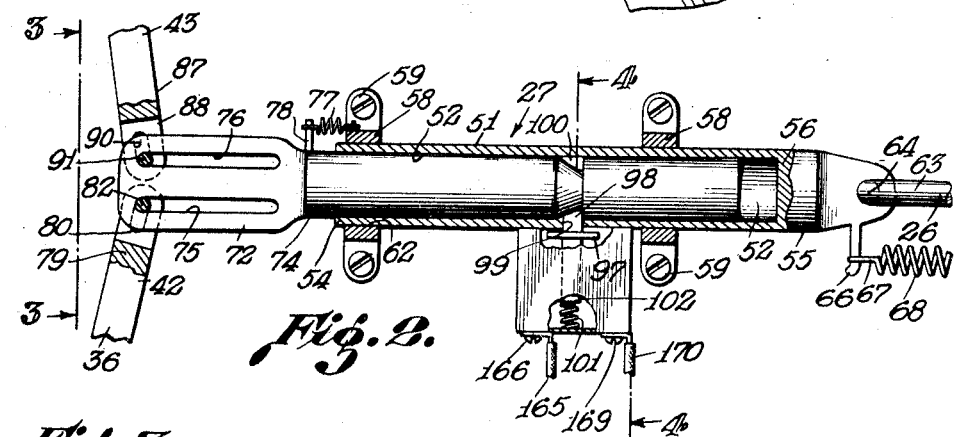
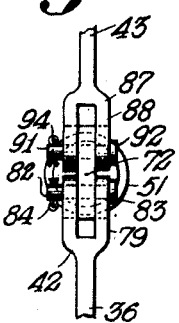
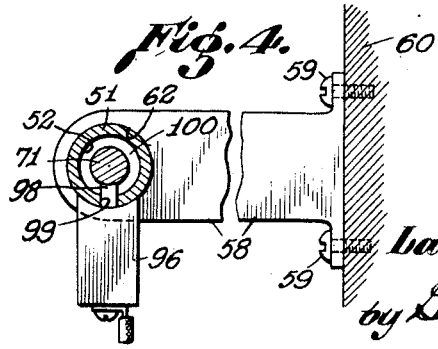
Inventor:
Lawrence Rosenthal,
by George A. Woodruff
Attorney Sept. 10, 1940.　　　L. ROSENTHAL　　　2,214,567
SPEED CONTROL MECHANISM
Filed July 13, 1936　　　2 Sheets-Sheet 2
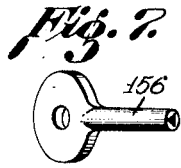
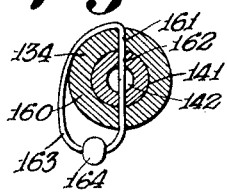
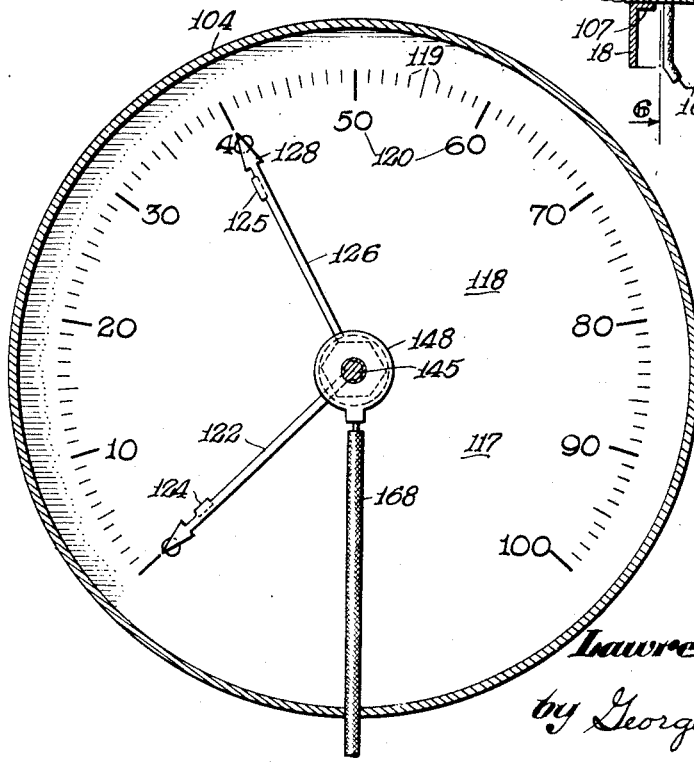
Inventor:
Lawrence Rosenthal,
by George A. Woodruff
Attorney Patented Sept. 10, 1940

2,214,567

UNITED STATES PATENT OFFICE 2,214,567

SPEED CONTROL MECHANISM

Lawrence Rosenthal, Ferguson, Mo., assignor, by mesne assignments, to Zone-O-Trol-Pierce, Incorporated, Anderson, Ind., a corporation of Indiana Application July 13, 1936, Serial No. 90,331

21 Claims. (Cl. 180—82.1)

This invention relates to speed control mechanisms and more particularly to an improved mechanism for selectively regulating the operative speed range of automotive vehicles and like powered traveling units.

It is an object of the invention to provide mechanism for the purpose noted, which is adapted for selectively controlling the operative speed range of an automotive vehicle or the like, the mechanism including means for rendering impossible the powered operation of the vehicle above a preselected speed.

Another object is found in the provision of an automatically controlled, separable connection between the vehicle throttle controls, such as the usual hand and foot operated accelerator devices, and the engine fuel control mechanism, the automatic control of the separable connection being such as to break the connection upon the vehicle attaining a predetermined speed of travel.

A further object is to provide, in combination with a separable connection operatively associated with the engine fuel control such as an engine throttle, and the throttle operating means therefor, a novel mechanism for controlling the operation of the separable connection, so as to render the connection inoperable to transmit control movements of the throttle operating means to the fuel throttle, upon the vehicle attaining a predetermined speed of travel, the control mechanism being operatively responsive to the speed of travel of the vehicle.

Yet another object is to provide in an automotive vehicle or other powered traveling unit, an improved device normally serving to complete the operative connection between the engine fuel control mechanism, such as an engine throttle, and the throttle controls therefor, the device including a pair of elements which are normally locked together so as to operate as a unit, but which are automatically disconnected responsively to the vehicle attaining a predetermined speed of travel, so as to render the throttle controls ineffective above the predetermined vehicle speed limit.

Further objects and advantages will appear from the following description and from the drawings, in which:

Fig. 1 illustrates in assembly, the improved mechanism embodying the features of this invention, the illustration showing the mechanism as applied to an automotive vehicle; Fig. 2 is an enlarged longitudinal elevation, shown partly in section, of a separable device forming a part of the operative connection between the engine fuel throttle and the throttle controls therefor; Fig. 3 is an end elevation of the device of Fig. 2, as viewed from line 3—3 in Fig. 2; Fig. 4 is a transverse sectional elevation of the device, as taken along line 4—4 in Fig. 2; Fig. 5 is an enlarged elevation, partly in section, of a speed indicating device or speedometer embodying certain features of the invention; Fig. 6 is a front elevation of the speedometer, as viewed from line 6—6 in Fig. 5; Fig. 7 illustrates a suitable key for regulating the control apparatus included as a part of the speedometer; Fig. 8 is a sectional elevation of the control apparatus associated with the speedometer, as taken along line 8—8 in Fig. 5, and Fig. 9 is a sectional elevation of the apparatus, as taken along line 9—9 in Fig. 5.

Referring now to the drawings by suitable characters of reference, Fig. 1 illustrates a portion of an automotive vehicle to which the improved speed control apparatus embodying the features of this invention is applied. That portion of the vehicle disclosed, includes an engine 10, transmission 11 and drive shaft 12, floor board 14, toe board 15, cowl board 16, instrument board or dash 18, engine hood 19, radiator 20 and a front wheel 1.

The engine 10 includes a fuel and fuel control mechanism 22 such as a carburetor of any suitable, well known type, for supplying a fuel mixture to a manifold 23, for ultimate delivery to the engine cylinders (not shown). Control of the fuel delivery to the manifold from the carburetor is effected through a control arm or lever 24 which is operatively associated with the carburetor throttle mechanism (not shown). Arm 24 is operatively connected, through a connecting element or rod 26, with a separable device forming a part of this invention, the device being denoted generally by the numeral 27. The device 27, which will be described in detail hereinafter, is adapted to serve as an operative connection between the carburetor throttle arm 24 and the vehicle throttle controls, such as a foot accelerator 28 disposed adjacent the toe board 15, and a hand accelerator 30 located on the dash board 18. The foot accelerator 28 has its operating stem or shaft 31 extended through the toe board 15, as through the bushing 32, with the end portion 34 thereof pivotally connected to the end 35 of a lever 36, as at 38. The lever 36 is pivotally mounted intermediate its ends, as at 39, to a frame portion 40 of the engine 10. The opposite end portion 42 of lever 36 is operatively associated with the device 27 in a preferred manner later to be described. The hand accelerator 30 on the dash 18 is also operatively associated with the device 27, in a manner later to be described, so as to be capable of regulating the operation of the carburetor throttle. The connection of accelerator 30 to the device 27 is, by preference, made through a lever 43 pivotally secured on its end 44 to a support 46 mounted on the cowl board 16. To this lever is connected one end 47 of a cable 48 associated with the accelerator 30 and slidably operated thereby through a conduit 50, the actuation of the accelerator 30 and its cable 48 serving to pivotally displace the lever 43, and hence through the lever 43 and the device 27, to operate the throttle arm 24.

The terms "separable connection" or "separable device" as used herein in the description of the mechanism and in the appended claims, is to be understood as defining a pair of elements which are normally interconnected or locked together so as to operate as a unit, but which may be operatively disconnected so that the elements may be capable of relative movement. The terms thus defined, have particular reference in the present disclosure to the device denoted by the numeral 27.

Proceeding now with a description of the automatically controlled, separable connection or device denoted generally by the numeral 27, and shown in enlarged detail in Figs. 2, 3 and 4, the device is comprised of a hollow, elongated cylinder or tubular sleeve element 51 having a bore or chamber 52. The chamber 52, which extends longitudinally of the sleeve element, and which is substantially coextensive with the length of the element, is open at one end 54 of the element, while on the opposite end 55 of the element, this chamber or bore is preferably closed, as by a wall 56. The element 51 is carried by and arranged for longitudinal sliding movement through a pair of spaced mounting members 58, these members being secured in any suitable manner, as by the bolts 59, to a frame portion 60 of the engine 10. As shown in Figs. 2 and 4, each of these members 58 is provided with an aperture 62 in which the element 51 is slidably seated. It is to be understood, of course, that any suitable means other than the elements 58 may be utilized to support the member 51, provided the supporting means employed will permit of axial displacement of this member. The element or rod 26 heretofore referred to in connection with the description of Fig. 1, has one end 63 operatively connected in any suitable manner, to the end portion 55 of the element 51, as at 64, while the opposite end 65 of the rod 26 (Fig. 1) is operatively connected to the throttle arm 24. The end 55 of member 51 is provided with a projection or arm 66 to which is connected one end 67 of a tension spring 68. As shown in Fig. 1, the opposite end 70 of the spring is secured, in any suitable manner, to the carburetor 22. Spring 68 serves to bias the element 51 and hence the throttle arm 24 through the connecting rod 26, toward one extreme position thereof, this position of the elements 51 and 24 being to the right, as viewed in Figs. 1 and 2. In the described extreme position of these elements, the throttle (not shown) controlled by the arm 24 will be positioned substantially to cut off or reduce to a minimum, the supply of fuel to the engine cylinders, so as to effect a reduction in engine speed to idling, as is the usual automotive practice. Sliding movement of the cylinder 51 to the left and against the tension of spring 68, as viewed in Figs. 1 and 2, will effect through arm 24, regulation of the engine throttle to increase the engine speed, and hence through the transmission 11 and drive shaft 12, an increased speed of travel of the vehicle.

Control movement of the throttle arm 24 through the element 51 and as a result of the actuation of either of the accelerator elements 28 and 30, is effected in a novel manner now to be described. Slidingly movable within the bore 52 of element 51 is a cylindrical element or plunger 71, the plunger having a flattened or planar portion 72 extending from the end portion 74 of the plunger, outwardly of and beyond the end 54 of the sleeve member 51, in the manner shown in Fig. 2. The portion 72 is provided with spaced, parallel apertures or slots 75 and 76, these slots being of substantially rectangular form and of a trend substantially longitudinally of the end portion 72. As a means for urging the plunger portion 71 inwardly of the bore 52, there is provided a spring 77 which is arranged between a supporting arm 78 on the plunger and the adjacent, stationary cylinder support 58. The accelerator devices 28 and 30 are operatively associated with the plunger 71 through the end 72 and slots 75 and 76, whereby these controls may be utilized, when the plunger and element 51 are interconnected to form a unit, as will be later described, to regulate at will, the position of the throttle arm 24 for controlling the speed of the engine and hence the speed of travel of the vehicle.

As before described in connection with the disclosure of Fig. 1, the respective levers 36 and 43 of the accelerator-controls 28 and 30 are operatively connected to the separable device 27, and more particularly, to the element 71 forming a part of this device. Considering, first, the operative connection of the accelerator 28 to the element 71, the lever 36 included as an operative element of the accelerator has its end 42 formed to provide a furcated portion, with the furcate elements 79 thereof spaced to receive therebetween the flat end 72 of the plunger 71, in the manner shown in Fig. 3. The furcate elements are provided with registering apertures or slots 80 which are, by preference, of substantially rectangular form. The operative connection of the furcated end of lever 36 to the plunger portion 72 is preferably made through a pin or bolt 82 which extends through the registering slots 80 and the slot 75 in the portion 72 of plunger 71, in the manner clearly shown in Figs. 2 and 3. The connecting pin is maintained in assembly by a head portion 83 formed on one end of the pin, and by a suitable retaining element or cotter pin 84 in the opposite end of the pin. The rectangular form of the slots 80 serves as a means for preventing a binding of the pin 82 in the slot 75 during the operation of the mechanism, as will be readily understood. A tension spring 86 is associated with the accelerator stem 31 in any suitable manner, this spring serving to urge the foot accelerator 28 outwardly of the toe board 15 to its throttle-closed position, as shown in Fig. 1.

The accelerator 30 is operatively associated with the plunger portion 72 in a manner similar to that described for the accelerator 28, the connection being effected through the pivoted lever 43. Accordingly, the lever 43 is formed with r furcated end 87, the furcate portions 88 of which are suitably spaced to receive therebetween the end portion 72 of plunger 71. The furcate elements 88 are provided with registering, substantially rectangular slots 90 for the reception of an assembly pin 91 which extends through these slots and through the plunger slot 76. The pin 91 is maintained in assembly in a manner similar to that of pin 82, as by providing the pin with a head portion 92 and a cotter pin 94. A suitable compression spring 95 is arranged to act upon the pivoted lever 43 in a direction to urge the cable 48 and accelerator element 30 to throttle-closed position, such position of these elements being shown in Fig. 1.

The described operative connection of the accelerators 28 and 30 to the plunger element 71 of the separable device 27, as effected through the slotted planar end 72 of the plunger and the furcated levers 36 and 43 associated respectively, with the accelerators 28 and 30, is preferred in the present example, but it is to be understood that any other suitable manner of effecting an operative connection of the accelerators to the plunger element 71 may be utilized, as desired.

The cylinder 51 and plunger 71 which are preferably and conveniently concentrically arranged, as shown in Figs. 2 and 4, comprise the operative elements of the separable connection or device referred to generally by the numeral 27 in the description of Fig. 1. During normal operation of the vehicle below a preselected speed limit, determined at will by means forming a part of this invention and hereinafter to be described, a substantial part of the plunger element 71 is disposed within the bore 52 of the element 51, and these two elements are detachably interconnected or locked together, as by an electromagnetic latching device presently to be described, for operation as a unit, in the control of the throttle arm 24 by either of the accelerators 28 and 30. As shown in Fig. 2, an electromagnet of any suitable type, referred to for convenience as a relay and denoted generally by the numeral 96, is secured in any desired manner (not shown) to an exterior portion of the cylinder 51, the location of the relay on the cylinder being between the cylinder supports 58. The relay being carried by the cylinder 51, will, of course, move with this element when the latter is slidingly actuated. The movable armature 97 of the relay carries a lock element or tongue 98 which normally extends through a suitable slot 99 in a portion of the cylinder wall, and into a recessed seat portion such as groove 100 formed in the plunger 71. With the tongue seated in the plunger slot, the element 51 and plunger 71 will be locked together, by reason of the fact that the tongue 98 is carried by the element 51, through the relay 96 mounted thereon. As will be readily observed, the tongue may be retracted from such locking position, upon the energization of the relay to attract the armature 97. A compression spring 101 is arranged to act against the lower end 102 of the armature 97 to urge the armature upwardly so as to tend to seat the tongue 98 in the plunger groove 100.

In the described locking position of the tongue element 98, the plunger 71 and cylinder 51 will be constrained to move as a unit, so as to provide for the normal control of the engine throttle. When the relay 96 is energized, however, through an energizing circuit later to be described, its armature 97 will be actuated to withdraw or retract the tongue 98 from its normal locking engagement with the plunger 71. In the latter instance, the elements 51 and 71 will no longer act as a unit, but will be conditioned for relative movement, so that movement of the plunger 71 as effected by either of the accelerators 28 and 30, will not be transmitted to the element 51 so as to effect any control movement of the throttle arm 24. It is noted here that, upon the retraction of the tongue 98, the spring 68 acting on the element 51 will effect a sliding movement thereof to the position shown in Fig. 2, and this in turn will effect through the bar 26, a movement of the arm 24 to its throttle-closed or idling position, this position of the arm being shown in Fig. 1. Thus it will be readily observed from the foregoing description, that as long as the tongue 98 is seated in the plunger recess or groove 100, the elements 51 and 71 will act as a unit, so that speed control movements of either of the accelerators 28 and 30 will be transmitted therethrough, to the throttle actuating arm 24. Also, it will be observed that upon the retraction of the tongue 98, resulting from the energization of the relay 96, the elements 51 and 71 will be disconnected so that they will no longer act as a unit serving to operatively connect the accelerator controls with the throttle arm. As a result of the retraction of the tongue 98, speed control movements of the accelerators 28 and 30 are rendered ineffective to actuate the throttle regulating arm 24. In this instance, the arm 24 will be automatically actuated by means of the spring 68, to its throttle-closed position, so as to reduce the engine speed to idling.

As will be later described, the relay 96 is energized only when the speed of the vehicle equals or exceeds a predetermined speed limit, whereupon the tongue 98 is retracted after the manner of disengaging a clutch, and serving to break the operative connection between the accelerator controls and the throttle arm 24. When the speed of the vehicle has been reduced below the predetermined speed limit, the tongue 98 may again engage the plunger groove 100, but this will occur only when the groove in the plunger 71 is in register with the tongue. Therefore, in order to effect a re-locking of the plunger and cylinder elements to enable further speed control of the vehicle, the plunger must be slidingly actuated within the bore 52 of the cylinder 51 until the tongue and groove are in register, when the tongue will seat in the groove. This may be accomplished by permitting the accelerator controls 28 and 30 to move toward their throttle-closed positions, as effected by their respective biasing springs 86 and 95, so as to allow the spring 77 to urge the plunger into the bore 52 until the tongue and groove are again brought into interlocking or latching engagement, whereupon, if the relay is de-energized, the tongue 98 will engage the groove 100, under the influence of the relay spring 101. In this manner the re-seating of the tongue 98 in the groove 100 may be readily and quickly effected, and this may be done before the speed of the vehicle has decreased to any appreciable extent below the predetermined speed limit thereof.

As is usual in automotive practice, the accelerators 28 and 30 are arranged for independent control of the throttle arm 24, the independency of the control in the present example being attained through the provision of the slots 75 and 76 in the end 72 of the plunger 71. For example, in the actuation of the cylinder and plunger unit 51—71 by the foot accelerator 28, through the lever 36 and the pin 82 in the slot 75 of the plunger end 72, so as to effect a longitudinal movement of the unit to the left, as viewed in Fig. 2, the pin 91 and its associated accelerator 30 will be unaffected by reason of the slot 76. In this instance, the plunger end 72 will simply move by the pin 91, by reason of the pin slot 76, as will be readily observed. In a similar manner, actuation of the accelerator 30 will not affect the accelerator 28. However, control of the throttle arm 24 by either of the accelerators may be taken over or assumed by the other accelerator in any control position of the plunger end 72, this being made possible by reason of the provision of the longitudinally extending slots 75 and 76, as will be readily seen.

Control of the energization of the relay 98 is effected by means of an energizing circuit which includes a novel circuit-closing device now to be described. The circuit-closing device is adapted to be operated responsively to the speed of travel of the vehicle. To this end, the device is by preference, operatively associated with means which is directly responsive to the vehicle speed, such means in the present example being found in a speed indicating mechanism or speedometer 104 of suitable type, mounted on the vehicle instrument board 18. Referring particularly to Figs. 5 and 6, the mechanism (not shown) of the speedometer 104 is enclosed by the housing 105, the forward or front end 106 of which is secured in any suitable manner to a flanged portion 107 of the dash board 18. The speedometer drive cable 108 is enclosed in a conduit 109 and extends, by preference, from the rear of the housing 105 to a suitable drive connection 110 associated with the vehicle wheel 21 (Fig. 1), the drive connection shown being of a well known type and including a pinion 111 operatively secured to the end of the speedometer cable 108, with the pinion enmeshing with a gear 112 driven by the wheel 21. If desired, the cable 108 may be driven from the vehicle drive shaft 12, as by a suitable connection thereto, the details of which are not shown as this connection may be of any well known type. The end 106 of the housing is formed to provide an annular, cushioned seat 115 in which is mounted a plate or disc 116 of glass or other rigid transparent material suitable for the purpose. Spaced from the glass plate 116 and inwardly of the housing 105, is a dial plate 117 upon the face 118 of which are formed suitable graduations 119 and speed indicia 120. The speed indicia 120 may consist of appropriate numerals indicating directly the speed of the vehicle in miles per hour. Centrally of the dial and extending therethrough, is a shaft element 121 which is operated by the speedometer mechanism (not shown). Secured to the end of the shaft 121 so as to be operated thereby, is a speed indicating hand or pointer 122 which cooperates with the graduations and speed indicia on the face of the dial 118. The pointer 122 which is formed of a suitable electrical conducting material, carries an electrical contact element 124 which is in arcuate register with a like contact element 125 carried by an adjustable arm or pointer 126. The pointer 126 which is also formed of conducting material, is arranged so that it may be positioned with its pointer end 128 opposite any one of the speed indicia or graduations thereof, the particular disposition of the pointer determining the powered speed limit of the vehicle in a manner later to be described.

The mounting of the adjustable pointer 126 on the speedometer 104 is effected in the following preferred manner. The glass plate 116 is centrally apertured as at 129 to receive a bushing 130 which is formed of a suitable insulating material, such as hard rubber. The bushing is formed with a flanged head 132 which, together with a washer element 133 of resilient material, is seated against the inner marginal portions of the glass about the opening 129. The body of the bushing which is externally threaded, extends through the opening 129 and outwardly of the glass 116 in the manner shown in Fig. 5. The bushing is retained in assembly with the glass by a securing member 134 formed of suitable insulating material, such as hard rubber. The member 134 is provided with an internally threaded central bore 136, the threaded portion of which threadedly engages the bushing 130. The outer end portion 137 of member 134 extends outwardly beyond the end 138 of the bushing, and is, by preference, of a diameter less than that of the inner end portion 140 of the member. The end portion 137 is provided with a shouldered seat 141 and a central bore 142 for a purpose presently to appear. The bore 142 communicates with the bore 136 and is of smaller sectional area than that of bore 136.

The bushing 130 is formed to provide a longitudinally extending bore 144 centrally thereof, in which is frictionally seated a shaft 145. The inner end 146 of this shaft is threaded and carries a terminal element 148 and the hub portion 149 of the adjustable pointer 126, the hub 149 being disposed between a nut 150 threadedly engaging the shaft end 146 and a washer 152 and nut 153, the latter nut also threadedly engaging the shaft end. In this manner the pointer 126 is operatively secured to the shaft end 146 so that it may be positioned relative to the dial face 118 by the actuation of shaft 145. As a means for operating the shaft, the outer end 154 thereof which extends into the bore 142 in member 134, is formed to receive a shaft turning key, such as the key 156 shown in Fig. 7. Thus, by engaging the shaft end 154 with the key 156, the shaft may be turned so as to position the pointer 126 relative to the graduations on the dial face 118. The shaft 145 is frictionally retained in the bushing 130 by the nuts 150 and 153 on the shaft end 146 and by an annular projection 157 on the shaft, the projection 157 frictionally seating in a depression 158 formed in the end 138 of the bushing 130. Thus when the shaft has been rotated, as by the key 156, so as to position the pointer 126 with its end 128 in register with a desired speed indicia or graduation on the dial face 118, the shaft and its pointer are maintained in such adjusted position by reason of the frictional seating of the shaft projection 157 in the seat 158 and also, by reason of the frictional clamping effect obtained through the cooperation of the projection 157 with the nuts 150 and 153 on the shaft end 146.

Once the pointer 126 has been adjusted relative to the dial face 118, further unintended adjustment thereof may be prevented by the provision of a cap 160 which closes the outer end of the bore 142 in the member 134, so as to prevent the insertion of the key 156 to operate the shaft 145. The cap engages the shouldered seat portion 141 in the end 137 of the member 134, in the manner shown in Fig. 5. The cap 160 and shouldered seat portion 141 are provided respectively, with registering openings or eyes 161 and 162 (Fig. 8) which are arranged diametrically of the elements, the eyes being provided for the reception of a wire sealing element 163 with which cooperates a lead or other soft metal seal 164. Thus with the cap and seal in place, any unwarranted adjustment of or tampering with the setting of the pointer 126 is effectively prevented. It is to be understood of course, that the cap and seal may be dispensed with if desired, the provision of these elements being made so that under particular circumstances, the speed limit of the vehicle determined by the setting of the pointer 126, may be maintained in spite of any desire of the operator of the vehicle to alter the speed limit setting of the pointer.

In the control of the speed of the vehicle, the pointers 122 and 126 and the cooperating contacts 124 and 125 carried thereby, respectively, serve as contact-making elements for an electric control circuit. Accordingly, the adjustable pointer 126 and its contact 125 are electrically associated, through the terminal element 148 and a conductor 165, with one terminal 166 of the relay 96 controlling the separable device 27 (Figs. 1 and 2). The conductor 165 is, by preference, enclosed in a suitable insulating cable 168. The opposite terminal 169 of the relay 96 is connected by a conductor 170 with one pole of a source of current, such as the battery 172, shown diagrammatically. If desired, the battery 172 may be the usual vehicle battery provided for supplying current to the engine ignition system, the vehicle lights, etc. The opposite pole of the battery may be grounded, as at 173, to any suitable metallic part of the vehicle, according to the usual practice. The control circuit is completed through a conductor 174 connecting the speedometer shaft 121 with the grounded pole of the battery 172, as by the ground connection 176 made to any metallic part of the vehicle which is conductively associated with the battery ground 173.

In the operation of the speed control mechanism embodying the improved features of this invention, the adjustable pointer 126 is first set so that its end 128 registers with a desired speed indicia on the speedometer dial face 118. In the position of the pointer 126 shown in Fig. 6, the speed limit of the vehicle is set for 40 miles per hour. With the relay 96 de-energized, the tongue 98 will be seated in the plunger groove 100, so that the plunger 71 and cylinder 51 will be locked together to form an operating unit in the control of the throttle arm 24 by the accelerators 28 and 30. With the elements of the mechanism related as described, the vehicle may be operated with the speed thereof controlled by the accelerators 28 and 30. As the speed of the vehicle is increased responsively to the actuation of either of the accelerators, the speedometer pointer 122 will be actuated over the face 118 of the dial 117 in a direction approaching the stationary pointer 126. When the vehicle speed is such as to cause the pointer 122 to move to a point adjacent the pointer 126 so that the contact 124 engages the contact 125, the energizing circuit for the relay 96 will be completed, whereupon the relay will effect a retraction of the tongue 98 from its seat in the groove 100 of plunger 71. In this instance, the plunger 71 and cylinder 51 will be disconnected so that they will no longer act as a unit, thereby breaking the operative connection of the accelerator controls with the throttle arm 24. At the same time, the spring 68 will actuate the cylinder 51 to the right as viewed in Fig. 2, this movement of the cylinder effecting through the rod 26, movement of the throttle arm 24 to its throttle-closed or idling position, whereby to reduce the engine speed and hence the speed of the vehicle. As the speed of the vehicle decreases below the predetermined speed limit, the speedometer pointer 122 will be actuated as a consequence thereof, so as to separate the contacts 124—125, whereupon the relay 96 will be deenergized. With the de-energization of the relay, the tongue 98 will be conditioned for a reseating in the plunger groove 100 when the groove is registered with the tongue. The registering of the groove 100 with the tongue may be effected readily and easily, in the manner heretofore described, as by permitting the accelerators 28 and 30 to move toward their throttle-closed positions, thus allowing the plunger spring 77 to actuate the plunger 71 inwardly of the cylinder 51 until the desired re-engagement of the tongue 98 with the groove 100 is attained. Thereafter, the accelerators 28 and 30 may be again actuated to control the throttle arm 24. Thus, from the foregoing description, it will be readily observed that the powered speed of travel of the vehicle cannot be any greater than the limit set by the pointer 126. Moreover, it will be noted that if the adjustable pointer 126 is positioned so that its contact 125 engages the contact 124 on the speedometer pointer 122 when the latter pointer is disposed in the position indicated in Fig. 6, wherein the speedometer pointer is in its initial or zero speed position, the energizing circuit for the magnet 96 will be completed so as to effect a retraction of the lock element 98 for the separable device 27. In this instance, the device 27 will be ineffective to transmit speed control movements of the accelerators 28 and 30 to the engine throttle arm 24. Thus, with the engine operating at idling speed, the powered speed of travel of the vehicle cannot be greater than the minimum speed produced by the engine operating at its idling speed. This minimum or idling speed of the vehicle is usually not greater than 10 miles per hour, and is determined by the idling speed for which the engine is set and by the load on the engine in propelling the vehicle.

It is desired to point out particularly that the operation of the improved speed control mechanism of this invention, to render the accelerator devices such as the foot accelerator 28 and the hand accelerator 30, ineffective to regulate the engine speed, is effected responsively to the speed of travel of the vehicle, and this is true whether the vehicle speed is produced by the operation of the engine, or produced by some agency other than the engine, as when the vehicle is permitted to move under its own momentum, or is permitted to coast down grade.

The preferred embodiment of this invention herein described and illustrated fully attains the foregoing objects and advantages, and further, presents an improved method and means for positively and automatically regulating the powered speed of travel of an automotive or like vehicle, so as to limit, selectively, the speed range of the vehicle to that desired. For example, by utilizing the control mechanism of this invention, the powered speed range of the vehicle may be regulated so that the upper speed limit of the vehicle cannot be greater than say, 40 miles per hour. Thus, the powered speed range of the vehicle would be from a minimum speed up to but not greater than 40 miles per hour.

Unlike many of the heretofore prevailing speed control systems provided for limiting the powered speed range of vehicles, the control system of this invention is independent of engine speed and is operated only in response to the speed of vehicle travel. This arrangement presents a distinct advantage, in that when the speed limiting mechanism is set to limit the vehicle to a maximum powered speed of travel of say 40 miles per hour, the mechanism will positively render the engine accelerating means ineffective to cause the engine to accelerate in speed upon the vehicle attaining the speed limit of 40 miles per hour, and this result will obtain independently of the engine speed and of the speed ratio between the engine and the vehicle drive shaft 12, as determined by the transmission control. Thus, when the vehicle transmission control is operated to effect a low speed but high torque power transmission from the engine to the drive shaft 12, as when the control is actuated to the so-called "first or low speed" position, the speed of the engine may be very high or near the maximum speed of which the engine is capable, while the speed of travel of the vehicle may be fairly slow and well below the upper limit set by the speed control mechanism. From this, it may be seen that the engine speed may be varied between the minimum and maximum speed limits thereof, and that during such engine speed variation, the control of engine speed by the accelerators will be cut off only upon the vehicle attaining a certain predetermined speed of travel.

While the improved speed control mechanism of this invention is preferably described by way of an example of its application, as operatively associated with a fuel throttle valve forming a part of a carburetor assembly, and with the accelerator controls for the valve, it is to be understood that the control mechanism may be utilized with equal facility, in fuel feeding systems of types other than that described. For example, in connection with a traveling unit which is propelled by an engine of the solid fuel injection type, as a Diesel engine or the like, wherein the fuel feeding system for this type of engine includes a fuel injection pump, and further, wherein the engine speed is controlled by regulating the fuel output of the injection pump, the novel separable device 37 of this invention and the control mechanism therefor, may be readily utilized in the regulation of the output of the fuel pump, so as to limit the powered speed of travel of the vehicle to a predetermined desired value.

Although the invention is described as applied to an automotive vehicle, it is not to be limited thereto, as it may be successfully utilized with any moving unit impelled by similar means. It is to be understood further, that although a single embodiment of the invention has been described and illustrated herein, it may be altered or modified without departing from the spirit and intended scope of the invention, as defined by the hereunto appended claims.

I claim:

1. A speed control mechanism for a traveling unit, propelling means for the unit, control mechanism associated with said propelling means and including a plurality of relatively movable elements, a member normally connecting the elements in a positive manner to preclude their relative movement, and means responsive to the speed of travel of the unit, adapted for actuating said connecting member to effect an operative disconnection of said elements, whereby to render said control mechanism ineffective to control the operation of said propelling means.

2. In a speed control mechanism for a vehicle provided with an engine, means for regulating the operation of said engine, control mechanism for said regulating means, including a plurality of relatively movable members, an element normally connecting said members for rendering said mechanism effective to control said engine regulating means, and means responsive to a predetermined speed of travel of the vehicle, adapted for actuating said connecting element to effect a disconnection of the members, whereby to render said mechanism ineffective to control said regulating means.

3. In combination in an automotive engine speed control mechanism, a speed accelerating mechanism including a separable device normally serving as an operative element of said mechanism, said separable device being composed of concentrically arranged, relatively movable members, an element adapted for connecting said members for operation as a unit, means for urging said element into and out of position to connect said members, and a speed responsive device for controlling the operation of said means.

4. In an automotive speed control mechanism, the combination with speed accelerating mechanism, of a separable control connection normally serving as operative elements of said accelerating mechanism, said separable connection being comprised of concentrically arranged members capable of relative axial movement, a movable element normally connecting said members so as to prevent their relative movement, and speed responsive control means adapted for actuating said movable connecting element to operatively disconnect said members.

5. In a speed control mechanism for an automotive vehicle, the combination with speed accelerating mechanism for the vehicle, of a separable control connection normally serving as operative elements of said accelerating mechanism, said connection comprising normally operatively related members capable of relative axial movement, a movable element normally locking said members against relative movement, and means responsive to a predetermined speed of travel of the vehicle, adapted for actuating said movable element to permit relative movement of said members.

6. In a speed control mechanism for an automotive unit, the combination with speed accelerating means for said unit, of a separable control connection associated with said means and normally serving as operating elements thereof, said connection comprising concentrically arranged members capable of relative movement, a movable element carried by one of said members and adapted for normally connecting the members to prevent relative movement therebetween, and means responsive to a predetermined speed of travel of the unit, for actuating said connecting element in a manner to effect an operative disconnection of said members to permit relative movement therebetween, whereby to render said speed accelerating means ineffective to control the speed of the unit.

7. A speed control mechanism for an automotive vehicle, speed accelerating means for said vehicle, said means including as operative elements thereof, a pair of relatively movable members, means normally preventing relative movement of said members, and mechanism adapted for operating said movement preventing means to permit relative movement between said members, so as to render said speed accelerating means ineffective to control the vehicle speed, upon the vehicle attaining a predetermined speed, said mechanism including a device operatively responsive to the speed of travel of said vehicle, and a control circuit including an electromagnet and circuit-closing elements operated by said speed responsive device.

8. A speed control mechanism for an automotive unit, propelling means for the unit, control mechanism associated with said propelling means and including a plurality of concentrically arranged, relatively movable members, an element adapted for connecting said members for operation as a unit, means urging said element into position to operatively connect said members, and means responsive to the speed of travel of the traveling unit, provided for actuating said element in a manner to effect an operative disconnection of the members, whereby to render said control mechanism ineffective to control the operation of said propelling means.

9. In a speed-limiting appliance for automotive vehicles including an engine, a fuel feed control linkage associated with the engine and including a sleeve element, a plunger element normally interlocked with the sleeve, an electromagnetic latching device normally interlocking said elements, a circuit for energizing said device, a switch in said circuit, and means responsive to vehicle speed for closing said switch.

10. A speed regulator for a throttle controlled vehicle comprising, in combination, primary control means responsive to the speed of the vehicle, secondary means for limiting the speed-increasing movement of the throttle comprising a pair of cooperable longitudinally shiftable members, latch means operably mounted on one of said members for engagement with the other of said members whereby to hold said members in nonshiftable relationship, and means actuable responsive to the primary control means for releasing the latch means whereby to permit said members to be freely shifted with respect to each other.

11. A speed regulator for a throttle controlled vehicle comprising, in combination, primary control means responsive to the speed of the vehicle, and secondary means for limiting the speed-increasing movement of the throttle, said secondary means including a pair of longitudinally shiftable normally latch-connected members and an electro-magnet mounted on and bodily shiftable with one of said latch-connected members actuatable responsive to the primary control means for unlatchingly disconnecting said members.

12. In an automotive speed control mechanism, the combination with speed accelerating mechanism, of a separable control connection normally serving as operative elements of said accelerating mechanism, said separable connection being comprised of concentrically arranged members capable of relative axial movement, a movable element normally connecting said members so as to prevent their relative movement, and speed responsive control means adapted for actuating said movable connecting element to operatively disconnect said members.

13. In a speed-limiting appliance for automotive vehicles including an engine, a fuel feed control linkage associated with the engine and including a sleeve element, a plunger element normally interlocked with the sleeve, an electromagnetic latching device normally interlocking said elements, a circuit for energizing said device, a switch in said circuit, and means responsive to vehicle speed for closing said switch.

14. In a speed control mechanism for an automotive vehicle, the combination with speed accelerating mechanism for the vehicle, of a separable control connection normally serving as operative elements of said accelerating mechanism, said connection comprising normally operatively related members capable of relative axial movement, a movable element normally locking said members against relative movement, and means responsive to a predetermined speed of travel of the vehicle, adapted for actuating said movable element to permit relative movement of said members.

15. Mechanism for varying the effective length of throttle actuating mechanism of internal combustion motors associated with a performance instrument, said mechanism comprising a cylinder, a plunger movably mounted in said cylinder, said cylinder and plunger forming a telescopic link in said throttle actuating mechanism, a catch co-operatively associated with said plunger, said catch normally holding said plunger in a fixed position with respect to said cylinder to impart a predetermined length to said link, an electric circuit including normally spaced contacts forming part of said instrument, a source of current, a relay, said relay when energized being adapted to release said catch from said plunger, and operating means for displacing said plunger, with respect to said cylinder, whereby the effective length of said link is varied upon energization of said relay to release said catch.

16. In mechanism for operating the throttle of an internal combustion motor, the combination of a pair of telescoping members forming a telescopic link in said throttle actuating mechanism, a latch carried by one of said members, said latch normally engaging the other of said members so that said link has one effective length, and release mechanism for said latch, said latch when released permitting the link to assume a different effective length.

17. The combination with mechanism for operating the throttle of an internal combustion motor associated with a performance instrument, of a pair of telescoping members, said members forming a telescopic link, a latch normally holding said members in predetermined relation, the link thus having one effective length, an electric circuit including normally spaced contacts forming part of said instrument, a source of current, and an electro-magnet with an associated armature for controlling said latch, said electro-magnet when energized being adapted to actuate said armature, whereby the said latch is released to permit said link to assume a different effective length.

18. A vehicle engine governing system, comprising a throttle valve member, a manually operated throttle control member for moving the valve member toward fully open position, a collapsible link structure connecting said members and comprising a solenoid electromagnet connected with one member and an armature operatively associated with the other member, a coiled spring operatively interposed between the magnet and armature and normally constraining the armature and magnet in extended relation, a current source, and a speed responsive switch for connecting the magnet and source to control vehicle speed.

19. In an automobile control in which a vehicle is provided with a throttle control to an engine, the engine driving the vehicle, and in which a manually operated mechanism actuates the throttle, combined with a link assembly in the manual control means to the throttle, said link assembly including an electromagnetic device, a slidable link, a latch means to latch the link in an active position, a speed device operated in accordance with vehicle speed, a source of electric power, means operated by the speed device to close an electric circuit to the electromagnetic device at a predetermined maximum vehicle speed, whereby the electromagnetic device is actuated to unlatch the slidable link and thereby render the said link assembly inactive to increase the engine and hence the vehicle speed.

20. In an automobile control in which the throttle is provided with a manually operable throttle control for the fuel of the engine, the engine driving the vehicle, and in which a speed device is actuated by the speed of the vehicle, said speed device having means to make an electric circuit at a predetermined maximum speed, combined with a link assembly in the throttle control including an electromagnetic device, a latch, a slidable rod forming part of the link, the latch being adapted to engage the rod for manual operation of the throttle, and an electric circuit thru the electromagnetic device and closed by the speed device at the predetermined maximum vehicle speed, the said electromagnetic device having means to disengage the latch to operatively free the rod from the latching action thereof and thereby prevent manual operation of the throttle.

21. A prime mover, a fuel feeding device for said prime mover biased to a minimum fuel feeding position, a control member for said fuel feeding device, and a speed responsive device connected between said fuel feeding device and said control member, said speed responsive device comprising a two-part link mechanism, a catch on one of said parts for locking said parts together for movement as a unit, a biasing means supported on the catch carrying part of said link mechanism for constraining said catch into locking position, a vehicle speed responsive device, and means operatively associating said vehicle speed responsive device and said biasing means irrespective of the position of said part on said link which carries said catch and said biasing means to actuate said catch.

LAWRENCE ROSENTHAL.